US009078199B2

(12) United States Patent
Hedberg et al.

(10) Patent No.: US 9,078,199 B2
(45) Date of Patent: Jul. 7, 2015

(54) METHODS AND USER EQUIPMENTS FOR GRANTING A FIRST USER EQUIPMENT ACCESS TO A SERVICE

(75) Inventors: Tomas Hedberg, Stockholm (SE); Gabor Fodor, Hässelby (SE); Gunnar Mildh, Sollentuna (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 168 days.

(21) Appl. No.: 13/993,216

(22) PCT Filed: Dec. 20, 2010

(86) PCT No.: PCT/SE2010/051428
§ 371 (c)(1),
(2), (4) Date: Jun. 11, 2013

(87) PCT Pub. No.: WO2012/087189
PCT Pub. Date: Jun. 28, 2012

(65) Prior Publication Data
US 2013/0281064 A1    Oct. 24, 2013

(51) Int. Cl.
*H04W 48/16*    (2009.01)
*H04W 74/00*    (2009.01)
*H04W 88/04*    (2009.01)

(52) U.S. Cl.
CPC .......... *H04W 48/16* (2013.01); *H04W 74/002* (2013.01); *H04W 74/004* (2013.01); *H04W 74/006* (2013.01); *H04W 88/04* (2013.01)

(58) Field of Classification Search
CPC ........ H04W 12/06; H04W 12/12; H04W 4/02
USPC .................. 455/410, 411, 414.1, 435.2, 426.1
See application file for complete search history.

(56) References Cited

U.S. PATENT DOCUMENTS

| 5,617,470 | A | * | 4/1997 | DePasquale ............. 379/114.14 |
| 7,457,418 | B2 | * | 11/2008 | Bunte et al. .................. 380/278 |
| 2004/0202132 | A1 | * | 10/2004 | Heinonen et al. ............. 370/331 |
| 2004/0203634 | A1 | * | 10/2004 | Wang et al. ................. 455/414.1 |

(Continued)

FOREIGN PATENT DOCUMENTS

| WO | 2004088641 A2 | 10/2004 |
| WO | 2010008432 A2 | 1/2010 |

OTHER PUBLICATIONS

3rd Generation Partnership Project, "3rd Generation Partnership Project; Technical Specification Group Services and System Aspects; Service requirements for Home Node B (HNB) and Home eNode B (HeNB) (Release 10)", Technical Specification, 3GPP T8 22.220 V10.4.0, Sep. 1, 2010, pp. 1-25, 3GPP, France.

(Continued)

*Primary Examiner* — Cong Tran
(74) *Attorney, Agent, or Firm* — Coats & Bennett, P.L.L.C.

(57) ABSTRACT

Methods, a radio base station, and a second user equipment are provided. The second user equipment is served by the radio base station and sends a first request for granting a first user equipment access to at least one service. A transfer of a first access code between the second user equipment-and the radio base station-takes place. The radio base station-receives, from the first user equipment, a second request for access to said at least one service and the code information based on the first access code. Then, the radio base station-sends, to the first user equipment, an access grant for granting the first user equipment-access to the at least one service in response to the second request and the code information, when the code information matches the first access code.

34 Claims, 4 Drawing Sheets

(56) References Cited

U.S. PATENT DOCUMENTS

| | | | |
|---|---|---|---|
| 2005/0026593 A1* | 2/2005 | Anderson et al. | 455/410 |
| 2007/0032221 A1* | 2/2007 | Badt | 455/410 |
| 2009/0098858 A1* | 4/2009 | Gogic | 455/411 |
| 2009/0191845 A1 | 7/2009 | Morgan et al. | |
| 2009/0254626 A1* | 10/2009 | Ahtisaari | 709/206 |
| 2010/0029273 A1* | 2/2010 | Bennett | 455/435.2 |
| 2012/0282921 A1* | 11/2012 | Motola et al. | 455/426.1 |

OTHER PUBLICATIONS

3rd Generation Partnership Project, "3rd Generation Partnership Project; Technical Specification Group Services and System Aspects; Architecture aspects of Home NodeB and Home eNodeB (Release 9)", Technical Report, 3GPP TR 23.830 V9.0.0, Sep. 1, 2009, pp. 1-56, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", Technical Specification, 3GPP TS 36.300 V9.5.0, Sep. 1, 2010, pp. 1-173, 3GPP, France.

* cited by examiner

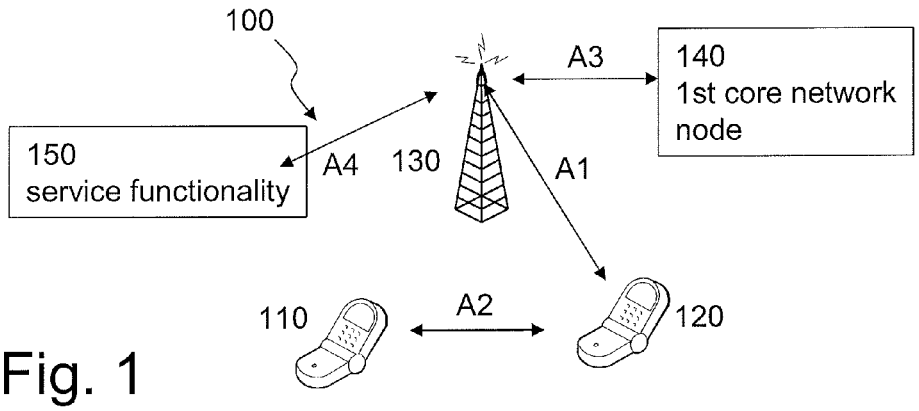
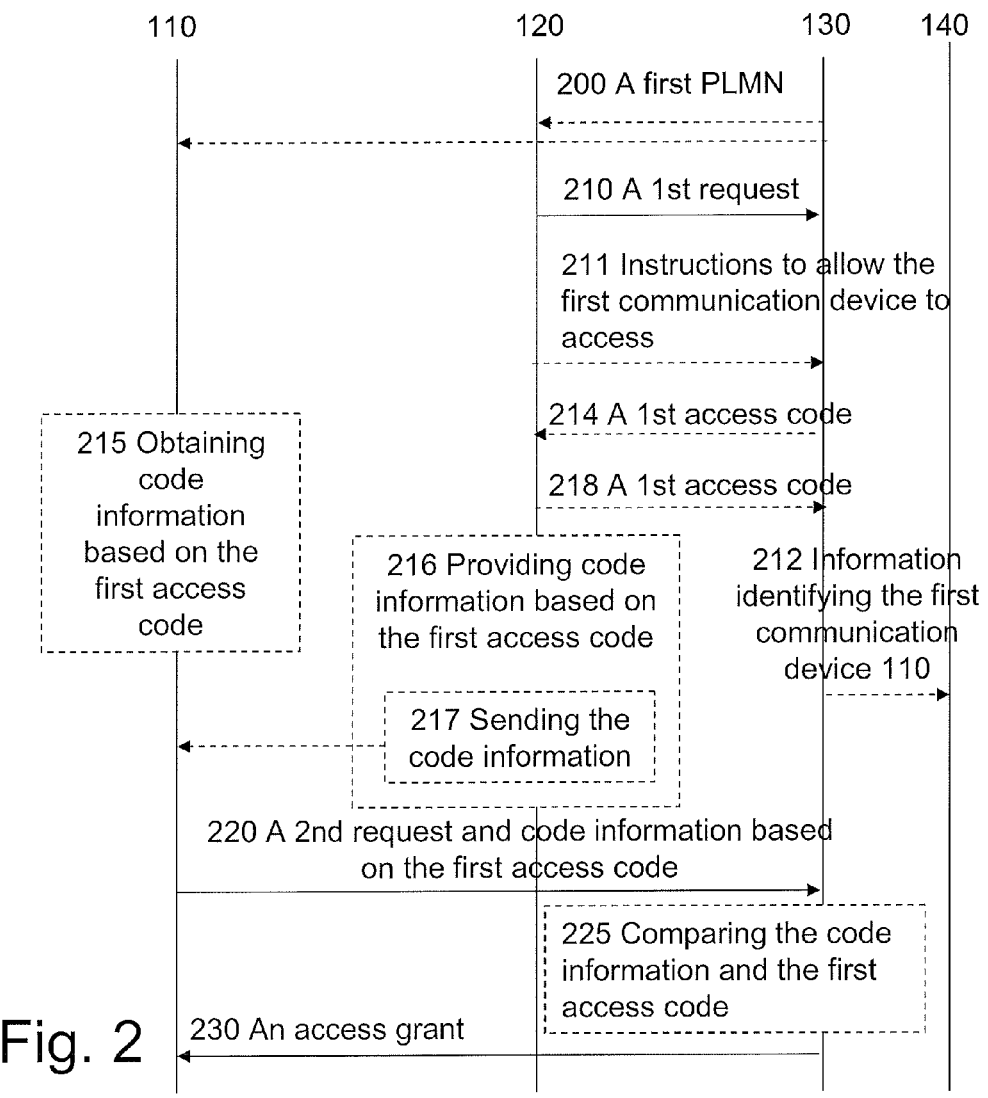
Fig. 1
Fig. 2

METHODS AND USER EQUIPMENTS FOR GRANTING A FIRST USER EQUIPMENT ACCESS TO A SERVICE

TECHNICAL FIELD

The present disclosure relates to the field of telecommunication. More particularly, the present disclosure relates to a method and a radio base station for granting a first user equipment access to at least one service and to a method and a second user equipment for enabling a first user equipment to access at least one service.

BACKGROUND

Presently, so called Hot Spots are becoming increasingly popular among users of devices capable of wirelessly connecting to such Hot Spots. The devices may be computers, laptops, Personal Digital Assistants (PDAs), cellular phones and the like. The Hot Spots allow the devices to wirelessly access numerous services, such as internet access, printer services and file storage services.

A Wireless Local Area Network access point (WLAN access point) is a known manner of providing a Hot Spot. A user that desires to access a service provided via the Hot Spot is often required to enter an encryption key to gain access. The encryption key may be provided free of charge or in exchange of a fee. As an example, a guest brings a device capable of communicating with the WLAN access point to a home of a host. Next, the guest wishes to use a printer, connected to a WLAN access point in the home of the host. Then, the guest enters an encryption key, received by the host, into the device. Thereby, the guest is allowed to access the WLAN access point and the printer connected thereto. Availability of the WLAN access point, i.e. how access to the WLAN access point is managed, is handled by the encryption key (or in some cases even without the encryption key).

Providers of telecommunication networks have realized the potential of Hot Spots. Therefore amongst other reasons, so called femto base stations are being developed in order to compete with the WLAN access point and the like. Femto base stations are developed as a part of Third Generation Partnership Project (3GPP) for both Universal Mobile Telecommunications System (UMTS) and Long Term Evolution (LTE).

A femto base station manages a number of cells. The femto base station broadcasts at least one PLMN (Public Land Mobile Network) identity in the cells. The PLMN identity, broadcast in the cells, belongs to an operator of the femto base station. A subscription is associated with an operator and, hence, also a PLMN identity which belongs to the operator. The PLMN identity is stored on a Subscriber Identity Module card (SIM card), or a Universal Subscriber Identity Module card (USIM card). The SIM card can be put inside a user equipment (UE), such as a mobile phone or the like. When the user equipment has a subscription, it can be said to belong to one of the following three categories in respect of the femto base station:

A first category, if the PLMN identity of the subscription matches the PLMN identity broadcast in the cell. The PLMN(s) broadcast in the cells are often referred to as Home PLMN (HPLMN) of the femto base station.

A second category, if the PLMN identity of the user equipment, i.e. of the subscription, is different from the HPLMN of the femto base station. In this case, the PLMN identity of the user equipment is often referred to as a Visitor PLMN (VPLMN) identity. If it is assumed that the HPLMN identity belongs to a first operator and the VPLMN identity belongs to a second operator, the second category can be divided into the following two sub-categories:

A first sub-category, if the second operator that owns the VPLMN identity has a roaming agreement with the first operator that owns the HPLMN identity. In short, a roaming agreement enables a user equipment to connect to other PLMN identities than the HPLMN identity.

A second sub-category, if the second operator does not have a roaming agreement with the first operator. When there is no roaming agreement between the first and second operators, a network of the first operator (HPLMN) and a network of the second operator (VPLMN) are called non-cooperating networks.

A user equipment, belonging to the second operator with the VPLMN identity, which has no roaming agreement with the first operator with the HPLMN identity, is not allowed to access the femto base station broadcasting the HPLMN identity. The business rationale is that the added traffic load, generated by such user equipment, implies added costs without at the same time rendering incomes to the first operator with the HPLMN identity.

In an existing system comprising a femto base station, it is assumed that the femto base station is connected to a core network, i.e. roaming visitors use standard non-access stratum signalling (NAS signalling) to attach to the network. After the user equipment has access to the femto base station, i.e. when a visiting user equipment is attached to the PLMN, it can use either global services via the core network, or local services.

Returning to the example with the guest above, it is now assumed that the host manages a local area network (LAN) comprising a femto base station as replacement of the WLAN access point. Moreover, it shall be assumed that the guest, i.e. the device of the guest, does not belong to the HPLMN identity of the femto base station and that there is no roaming agreement between the HPLMN identity of the femto base station and the VPLMN identity of the guest. This means that a first SIM card, installed into the device of the guest, does not belong to the HPLMN identify of the femto base station. In such case, the visitor will have to put in a second SIM card into the device. The second SIM card, belonging to the HPLMN identity of the femto base station, may be provided by the host. Now, it will be possible for the device of the guest to access the femto base station. Disadvantageously, manual interaction is required. In addition, the device may even have to be restarted, while causing interruptions, such as dropped IP connection, in order to access a service provided by the femto base station.

In order to improve availability of femto base stations, it has been made possible to associate a femto base station with multiple PLMN identities. In this manner, it is intended that the visitor can find one PLMN identity of the femto base station that is compatible with the PLMN identity of the visitor's device. It is currently possible for a femto base station to broadcast up to 6 PLMN identities. In order for a femto base station to broadcast PLMN identities associated to different operators, business agreements, such as roaming agreements or other business agreement for a purpose of determining how to share costs and/or revenues when UEs are served as guests (or visitors) in a network, need to be reached. This may be viable if femto base stations are allocated to a carrier that is not used by macro cells operating in the same area as the femto base station. Operators could then split costs for the spectrum license of the used carrier. However, it may be difficult to agree on proportions of the costs. Moreover, in some cases it may be that a carrier, not used by the macro cells, is not available.

Moreover, in another scenario, a femto base station belongs to one PLMN identity. The PLMN identity can be reconfigured to match a preference of a visitor. In this manner, devices (of visitors) belonging to only one PLMN identity can be supported simultaneously. Furthermore, interruption and/or delay in conjunction with reconfiguration may be considerable.

In yet another scenario, where the device of the visitor belongs to the PLMN identity of the femto base station, the device may still be prevented from accessing the femto base station because of a so called allowed Closed Subscriber Group (CSG) List. The device will be blocked from accessing the femto base station if the CSG identifier (or identity) of the femto base station is not found in the allowed CSG List (specific for this UE). After manually adding the device to the allowed CSG List, the device may access the femto base station. Administration of adding the device to the allowed CSG List may be cumbersome.

Hence, there is a need for an improvement of the availability of the femto base station.

SUMMARY

An object may be how to improve availability of a radio base station, such as a femto base station.

According to an aspect, this object, and other objects, may be achieved by a method in a radio base station for granting a first user equipment access to at least one service. A second user equipment is served by the radio base station. A radio communication system comprises the radio base station, the first user equipment and the second user equipment. The radio base station receives, from the second user equipment, a first request for granting the first user equipment access to said at least one service. The radio base station sends, to the second user equipment, a first access code, or the radio base station receives, from the second user equipment, a first access code. Furthermore, the radio base station receives, from the first user equipment, a second request for access to said at least one service and code information based on the first access code. The radio base station sends, to the first user equipment, an access grant for granting the first user equipment access to said at least one service in response to the second request and the code information, when the code information matches the first access code.

According to another aspect, this object, and other objects, may be achieved by a radio base station configured for granting a first user equipment access to at least one service. A second user equipment is served by the radio base station. A radio communication system comprises the radio base station, the first user equipment and the second user equipment. The radio base station comprises a receiver configured to receive, from the second user equipment, a first request for granting the first user equipment access to said at least one service. Moreover, the receiver is configured to receive, from the first user equipment, a second request for access to said at least one service, and code information based on a first access code. The radio base station further comprises a transmitter configured to send, to the first user equipment, an access grant for granting the first user equipment access to said at least one service when the code information matches the first access code. Moreover, the receiver is configured to receive from the second user equipment the first access code, or the transmitter is configured to send to the second user equipment the first access code.

According to a further aspect, this object, and other objects, may be achieved by a method in a second user equipment for enabling a first user equipment to access at least one service. The second user equipment is served by the radio base station. The second user equipment sends to, to the radio base station, a first request for granting the first user equipment access to said at least one service. The second user equipment sends, to the radio base station, the first access code, or the second user equipment receives, from the radio base station, the first access code.

According to yet another aspect, this object, and other objects, may be achieved by a second user equipment configured for enabling a first user equipment to access at least one service. The second user equipment is served by the radio base station. The second user equipment comprises a transmitter configured to send, to the radio base station, a request of granting the first user equipment access to said at least one service. The transmitter is further configured to send, to the radio base station, the first access code, or the second user equipment further comprises a receiver configured to receive, from the radio base station, the first access code.

In some embodiments, the second user equipment, being served by the radio base station, sends, to the radio base station, the first request for granting the first user equipment access to said at least one service. In this manner, the second user equipment, which has access to the radio base station, may notify the radio base station about a coming attempt for access by the first user equipment. Furthermore, a transfer of the first access code between the second user equipment and the radio base station takes place. The code information based on the first access code may also be provided to the first user equipment. In this manner, authentication of the first user equipment to the radio base station may be managed. Moreover, the radio base station receives, from the first user equipment, the second request for access to said at least one service and the code information based on the first access code. In this manner, the first user equipment requests access by authenticating itself by the information based on the first access code. Then, the radio base station sends, to the first user equipment, the access grant for granting the first user equipment access to said at least one service in response to the second request and the code information, when the code information matches the first access code. Thus, the first user equipment is allowed to access the radio base station. As a result, management of access by the first user equipment to the radio base station is facilitated as compared to solutions in the prior art. Hence, the above mentioned object is achieved.

Advantageously, competitiveness of femto base station in relation to a WLAN access point or the like is improved. As an example, UTRAN and E-UTRAN may compete better with WLAN, such as 'WiFi Direct'.

BRIEF DESCRIPTION OF THE DRAWINGS

The various aspects of embodiments disclosed herein, including particular features and advantages thereof, will be readily understood from the following detailed description and the accompanying drawings, in which:

FIG. 1 shows a schematic overview of an exemplifying radio communication system, FIG. 2 shows a schematic, combined signalling and flow chart of an exemplifying method in the radio communication system according to FIG. 1 for granting a first user equipment access to at least one service.

DETAILED DESCRIPTION

Figure 3:
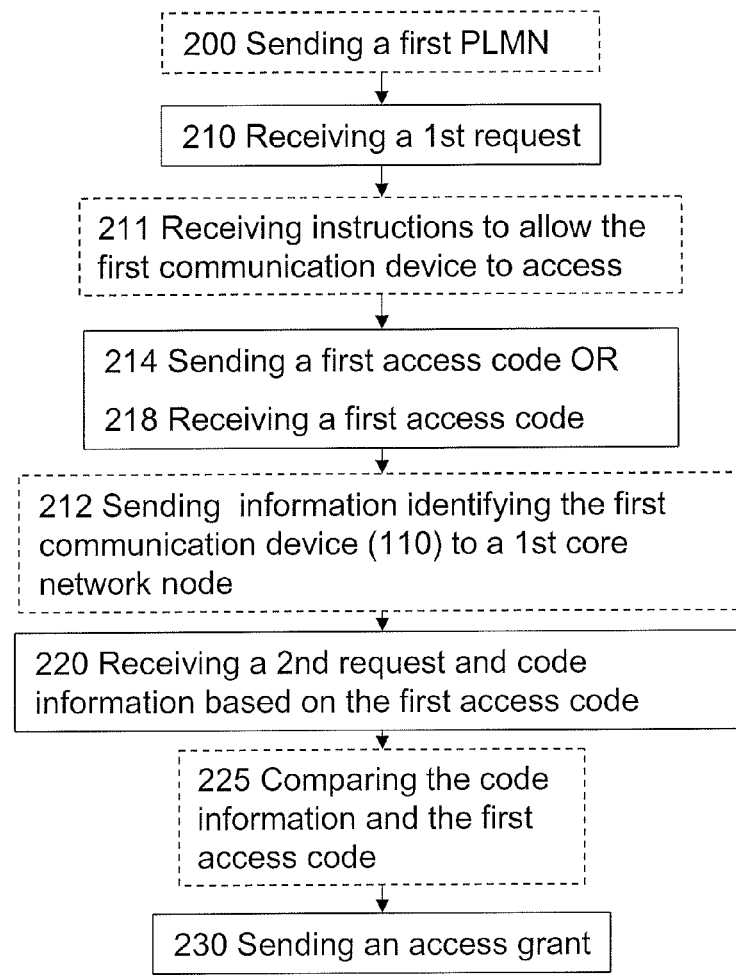
FIG. 3 shows a schematic flow chart of an exemplifying method in the radio base station for granting a first user equipment access to at least one service.

Throughout the following description similar reference numerals have been used to denote similar elements, parts, items or features, when applicable. In the Figures, features that appear in some embodiments are indicated by dashed lines.

FIG. 1 shows a schematic overview of an exemplifying radio communication system 100, comprising a radio base station 130, a first core network node 140, a service functionality 150, a first user equipment 110 and a second user equipment 120. The radio communication system 100 may be a Long Term Evolution (LTE) system. The radio base station 130 may be a femto base station, a Home eNodeB (HeNB) or the like. The first core network node 140 may be a Mobility Management Entity (MME). The second user equipment 120 may be served by the radio base station 130 as indicated by a first arrow A1. A second arrow A2 indicates that the first and second user equipment 110, 120 may communicate with each other using a Short Message Service (SMS), a Multimedia Messaging Service (MMS), Bluetooth communication, IR-communication or the like. The third and fourth arrows A3, A4 indicates connections between the radio base station 130 and the first core network node 140, and the service functionality 150, respectively. The connections may be wireless, by wire, fibre or the like. The term "user equipment" may denote a mobile phone, a cellular phone, a Personal Digital Assistant (PDA) equipped with radio communication capabilities, a smart phone, a laptop equipped with an internal or external mobile broadband modem, a portable electronic radio communication device or the like.

In some embodiments, the service functionality may be an IP connectivity function, such as a Serving Gateway (S-GW) and/or a Packet Data Network Gateway (PDN-GW), which may provide access to a service on the Internet (or in a core network of the radio communication system 100).

In some embodiments, there may be a local S-GW (and/or a local PDN-GW), via which the first and/or second user equipment 110, 120 may access a local server hosting a local service. A local server may be a part of the radio base station 130 or located in the vicinity thereof.

In some embodiments, the service functionality 150 may be a local IP connectivity function, such as a Dynamic Host Configuration Protocol server (DHCP server), which allows the second user equipment to access a local service provided by for example a printer connected (wirelessly or by wire) to the radio base station 130.

In some embodiments, the service functionality 150 may be the local service itself. For example, the service functionality 150 may be a software application providing a measurement of temperature, pressure, humidity and the like.

In FIG. 2, there is shown an exemplifying, schematic combined signalling and flow chart for illustrating the relationship between embodiments of the methods in the radio base station 130 and the second user equipment 120, respectively. The following actions, such as steps, may be performed. Notably, in some embodiments the order of the actions may differ from what is indicated below. Actions, indicated by dashed lines in FIG. 2, may be performed in some embodiments.

Action 200

In some embodiments, the radio base station 130 sends a first Public Land Mobile Network identity, referred to as "PLMN identity", for identification of a network, comprising the radio base station 130, to the first and second user equipments 110, 120. The second user equipment 120 is associated to the first PLMN identity, whereby the second user equipment 120 is allowed to be served by the radio base station 130. As an example, the radio base station 130 broadcasts system information, which comprises the first PLMN identity.

Action 210

The radio base station 130 receives, from the second user equipment 120, a first request for granting the first user equipment 110 access to said at least one service.

Action 211

In some embodiments, the radio base station 130 receives, from the second user equipment 120, instructions for preparing the radio base station 130 to allow the first user equipment 110 to access said at least one service. As an example, if the radio base station 130 sends a grant in response to the first request to the second user equipment 120, then the second user equipment 120 may send additional instructions to the radio base station 130. The additional information may be carrier frequency, time slots, resources and the like to use for connection with the first user equipment 110. The additional information may also specify what services (or service types, such as local services only, printer services and more) are allowed to be accessed by the first user equipment. Notably, in some embodiments the additional information may be included in the first request.

Action 212

In some embodiments, the radio base station 130 sends information identifying the first user equipment 110 to a first core network node 140 comprised in the radio communication system 100. As an example, the radio base station 130 may send information about a CSG identifier of the radio base station 130 in addition to the information identifying the first user equipment 110. As a result, the first core network node 140 may add information for allowing the first user equipment 110 to be served by the radio base station 130 to a list for the first user equipment 110. The information for allowing the first user equipment 110 to be served by the radio base station 130 may, as an example, be the CSG identifier. The list may, as an example, be an allowed CSG List. In this embodiment, the list managed by the first core network node 140 initially lacks information for allowing the first user equipment 110 to be served by the radio base station 130. For example, the list for the first user equipment 110 may not comprise the CSG identifier of the radio base station 130. In some embodiments, the first core network node 140 manages for each of the first and second user equipments a respective list of allowed CSG identifiers, which respective list indicates if the respective first or second user equipment is allowed to be served by the radio base station 130. In this manner, a CSG identifier of the radio base station 130 may be (automatically) added to the list for the first user equipment 110, i.e. a subscription associated to a SIM card of the first user equipment 110. It is to be understood that the list may be handled by the first core network node 140 or it may be that the first core network node 140 forwards the information to a network node, such as a Home Subscriber Server (HSS), which handles (or manages) the list.

The method may further comprise one of the following actions, i.e. one of action 214 and action 218.

Action 214

The radio base station 130 sends a first access code to the second user equipment 120.

Action 218

The radio base station 130 receives a first access code from the second user equipment 120.

In a first example, the radio base station 130 sends the first access code to the second user equipment 120. Hence, the radio base station 130 determines the value of the first access code. As an example, the radio base station 130 may then store the first access code such that the same code may be used again even if another user equipment than the second user equipment 120 sends the first request to the radio base station 130.

In a second example, the radio base station 130 receives the first access code from the second user equipment 120. Hence, the second user equipment 120 determines the value of the first access code. For example, a user of the second user equipment 120 may input the first access code into the second user equipment 120. In this manner, the first access code may be selected by the user.

In a third example, the radio base station 130 receives the first access code and sends a second access code in return. The combined procedure may be useful to, for example, add security by combining one "secret", i.e. the first access code, from the second user equipment 120, such as a Host user (typically manually entered) with a network-side "secret" into one combined "key", such as the second access code, which is returned to the second user equipment 120 and is provided to the first user equipment in action 217 below.

Action 215

In some embodiments, the first user equipment 110 obtains code information based on the first access code. As an example, the code information is displayed on a display of the second user equipment 120. A user of the first user equipment may input the code information into the first user equipment, which thereby obtains the code information. As another example, the second user equipment 120 may send, as indicated by arrow A2 in FIG. 1, the code information to the first user equipment 110.

Action 216

In some embodiments, the second user equipment 120 provides the code information, based on the first access code, for use by the first user equipment 120 to access said at least one service.

Action 217

In some embodiments, the second user equipment 120 sends the code information to the first user equipment 110.

Action 220

The radio base station 130 receives, from the first user equipment 110, a second request for access to said at least one service and code information based on the first access code. As an example, the second request may comprise the code information. As another example, the second request and the code information are sent simultaneously or separately from the first user equipment 110. When the second request and the code information are sent simultaneously, an advantage may be that signalling overhead may be less than compared to sending the second request and the code information separately, i.e. in different messages and/or the like.

Action 225

In some embodiments, the radio base station 130 compares (or matches) the code information with the first access code to determine whether the code information matches the first access code. If the comparison indicates that the code information and the first access code are related, then action 230 is performed. In some embodiments of the method in the radio base station 130, the code information matches the first access code, when the code information is equal to the first access code, or when the code information is derivable from the first access code. As an example, the first access code may be a public key and the code information may be a private key. The public and private keys may form a public-private key pair known from asymmetric cryptography. As another example, the first access code and the code information may be a secret password or the like. Moreover, as an example, the code information may be related, or associated, to the first access code, when the code information matches the first access code.

Action 230

The radio base station 130 sends, to the first user equipment 110, an access grant for granting the first user equipment 110 access to said at least one service in response to the second request and the code information, when the code information matches the first access code.

In some embodiments of the method in the radio base station 130, the first user equipment 110 is associated to a second PLMN identity, which is different from the first PLMN identity.

Now referring to FIG. 3, there is shown an exemplifying method in a radio base station 130, such as a femto base station, for granting a first user equipment 110 access to at least one service. A second user equipment 120 is served by the radio base station 130. A radio communication system 100 comprises the radio base station 130, the first user equipment 110 and the second user equipment 120. The following actions may be performed in the radio base station 130.

Action 200

In some embodiments of the method in the radio base station 130, the radio base station 130 sends a first Public Land Mobile Network identity, referred to as "PLMN identity", for identification of a network, comprising the radio base station 130, to the first and second user equipments 110, 120. The second user equipment 120 is associated to the first PLMN identity, whereby the second user equipment 120 is allowed to be served by the radio base station 130.

Action 210

The radio base station 130 receives, from the second user equipment 120, a first request for granting the first user equipment 110 access to said at least one service.

Action 211

In some embodiments of the method in the radio base station 130, the radio base station 130 receives, from the second user equipment 120, instructions for preparing the radio base station 130 to allow the first user equipment 110 to access said at least one service.

Action 212

In some embodiments of the method in the radio base station 130, the radio base station 130 sends information identifying the first user equipment 110 to a first core network node 140 comprised in the radio communication system 100. The first core network node 140 manages a list of user equipments which are allowed to access said at least one service from a set of base station(s). The list comprises information identifying the second user equipment 120. The list lacks information identifying the first user equipment 110. In this manner, the radio base station 130 enables the first core network node 140 to add the first user equipment 110 to the list of user equipments which are allowed to access said at least one service in response to receiving the first request.

The method may further comprise one of the following actions, i.e. one of action 214 and action 218.

Action 214

The radio base station 130 sends a first access code to the second user equipment 120.

Action 218

The radio base station 130 receives a first access code from the second user equipment 120.

Action 220

The radio base station 130 receives, from the first user equipment 110, a second request for access to said at least one service and code information based on the first access code.

Action 225

In some embodiments, the radio base station 130 compares (or matches) the code information with the first access code to determine whether the code information matches the first access code. If the comparison indicates that the code information and the first access code are related, then action 230 is performed. In some embodiments of the method in the radio base station 130, the code information matches the first access code, when the code information is equal to the first access code, or when the code information is derivable from the first access code.

Action 230

The radio base station 130 sends, to the first user equipment 110, an access grant for granting the first user equipment 110 access to said at least one service in response to the second request and the code information, when the code information matches the first access code.

In some embodiments of the method in the radio base station 130, the first user equipment 110 is associated to the first PLMN identity sent by the radio base station 130.

In some embodiments of the method in the radio base station 130, the first user equipment 110 is associated to a second PLMN identity, which is different from the first PLMN identity. As an example, the first user equipment 110 may be associated to a first operator PLMN identity belonging to a first operator. The first operator PLMN identity is different from a second operator PLMN identity belonging to a second operator. The first PLMN identity may be the second operator PLMN identity. Moreover, it may be that the first and second operator does not have a so called roaming agreement. The roaming agreement makes it possible for the first operator to allow devices belonging to the second operator PLMN identity to access base stations of the first operator, and vice versa. Hence, since there is no roaming agreement and the first operator PLMN identity is different from the second PLMN identity, the first user equipment 110 will not be allowed to access the radio base station 130.

In some embodiments of the method in the radio base station 130, said at least one service is provided by the radio base station 130. As an example, when the radio base station 130 provides the service, it may be a local service. As another example, when the radio base station 130 provides the service, the radio base station 130 may provide access to the service, which need not be a local service.

In some embodiments of the method in the radio base station 130, said at least one service further is operated by the radio base station 130. As an example, a local service is said to be operated by the radio base station 130.

In some embodiments of the method in the radio base station 130, said at least one service further is operated by a second network node, such as a server on the Internet, while said at least one service is provided to the first user equipment 110 via the radio base station 130. In some embodiments, the radio communication system 100 further comprises the second network node, such as a second core network node which may host said at least one service.

In some embodiments of the method in the radio base station 130, said at least one service is implemented in a service layer of a protocol stack used in the radio communication system 100. It may be noted that the service layer is different from a control layer and a transport/access layer of a protocol stack.

Figure 4:
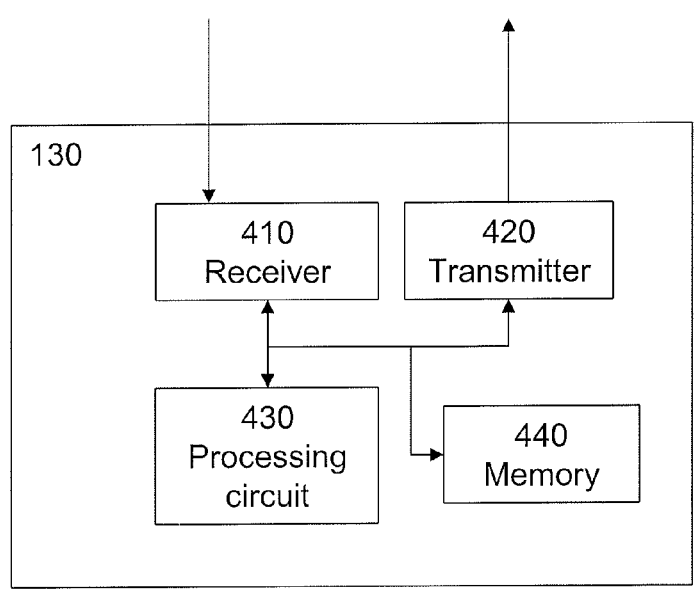
FIG. 4 shows a schematic block diagram of exemplifying radio base station configured for granting a first user equipment access to at least one service.

In FIG. 4, there is shown a schematic block diagram of an exemplifying radio base station 130 configured for granting a first user equipment 110 access to at least one service. A second user equipment 120 is served by the radio base station 130. A radio communication system 100 comprises the radio base station 130, the first user equipment 110 and the second user equipment 120. The radio base station 130 comprises a receiver 410 configured to receive, from the second user equipment 120, a first request for granting the first user equipment 110 access to said at least one service. Furthermore, the receiver 410 is configured to receive, from the first user equipment 110, a second request for access to said at least one service, and code information based on a first access code. The radio base station 130 comprises a transmitter 420 configured to send, to the first user equipment 110, an access grant for granting the first user equipment 110 access to said at least one service when the code information matches the first access code. Moreover, the receiver 410 further is configured to receive from the second user equipment 120 the first access code, or the transmitter 420 further is configured to send to the second user equipment 120 the first access code.

In some embodiments of the radio base station 130, the radio base station 130 may further comprise a processing circuit 430. The processing circuit 430 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the radio base station 130, the radio base station 130 may further comprise a memory 440 for storing software to be executed by, for example, the processing circuit. The software may comprise instructions to enable the processor to perform the method in the radio base station 130 described above. The memory 440 may be a hard disk, a magnetic storage medium, a portable computer diskette or disc, Flash memory, random access memory (RAM) or the like. Furthermore, the memory may be an internal register memory of a processor.

In some embodiments of the radio base station 130, the processing circuit (430) is configured to compare the code information with the first access code to determine whether the code information matches the first access code. The processing circuit (430) is configured to store the first access code and the code information in the memory (440). In some embodiments of the radio base station 130, the code information matches the first access code, when the code information is equal to the first access code, or when the code information is derivable from the first access code.

In some embodiments of the radio base station 130, the transmitter 420 further is configured to send a first Public Land Mobile Network identity, referred to as "PLMN identity", for identification of a network, comprising the radio base station 130, to the first and second user equipments 110, 120. The second user equipment 120 is associated to the first PLMN identity, whereby the second user equipment 120 is allowed to be served by the radio base station 130.

In some embodiments of the radio base station 130, the first user equipment 110 is associated to the first PLMN identity sent by the radio base station 130.

In some embodiments of the radio base station 130, the transmitter 420 further is configured to send information identifying the first user equipment 110 to a first core network node 140 comprised in the radio communication system 100. The first core network node 140 manages a list of user equipments which are allowed to access said at least one service. The list comprises information identifying the second user equipment 120. The list lacks information identifying the first user equipment 110. In this manner, the radio base station is configured to enable the first core network node 140 to add the first user equipment 110 to the list of user equipments which are allowed to access said at least one service in response to receiving the first request.

In some embodiments of the radio base station 130, the first user equipment 110 is associated to a second PLMN identity, which is different from the first PLMN identity.

In some embodiments of the radio base station 130, said at least one service is able to be provided by the radio base station 130. Expressed differently, the radio base station 130 is further configured to provide said at least one service. Thus, said at least one service may be operated by the radio base station 130 or may be provided to the first user equipment 110 via the radio base station 130.

In some embodiments of the radio base station 130, said at least one service is further able to be operated by the radio base station 130. Expressed differently, the radio base station 130 is further configured to operate said at least one service.

In some embodiments of the radio base station 130, said at least one service is further able to be operated by a second network node while said at least one service is provided to the first user equipment 110 via the radio base station 130. In some embodiments, the radio communication system 100 further comprises the second network node, such as a second core network node.

In some embodiments of the radio base station 130, said at least one service is able to be implemented in a service layer of a protocol stack used in the radio communication system 100.

In some embodiments of the radio base station 130, the receiver 410 further is configured to receive, from the second user equipment 120, instructions for preparing the radio base station 130 to allow the first user equipment 110 to access said at least one service.

Figure 5:
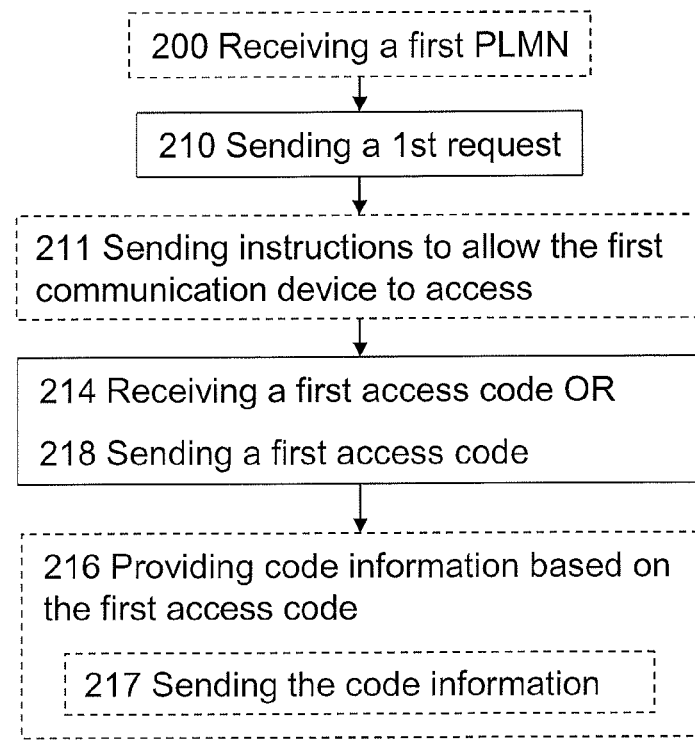
FIG. 5 shows a schematic flow chart of an exemplifying method in the second user equipment for enabling a first user equipment to access at least one service.

With reference to FIG. 5, there is shown a schematic flow chart of an exemplifying method in the second user equipment 120 for enabling a first user equipment to access at least one service. The second user equipment 120 is served by the radio base station 130. The following actions may be performed. Notably, in some embodiments the order of the actions may differ from what is indicated below.

Action 200

In some embodiments of the method in the second user equipment 120, the second user equipment 120 receives, from the radio base station 130, a first PLMN identity. The second user equipment 120 is associated to the first PLMN identity, and the first user equipment 110 is associated to a second PLMN identity which is different from the first PLMN identity.

Action 210

The second user equipment 120 sends, to the radio base station 130, a first request for granting the first user equipment 110 access to said at least one service. As an example, the first request may prepare the radio base station 130 to allow the first user equipment 110 access to said at least one service based on a first access code.

Action 211

In some embodiments of the method in the second user equipment 120, the second user equipment 120 sends, to the radio base station 130, instructions for preparing the radio base station 130 to allow the first user equipment 110 to access said at least one service.

The method may further comprise one of the following actions, i.e. one of action 214 and action 218.

Action 214

The second user equipment 120 receives the first access code from the radio base station 130.

Action 218

The second user equipment 120 sends the first access code to the radio base station 130.

Action 216

In some embodiments of the method in the second user equipment 120, the second user equipment 120 provides code information, based on the first access code, for use by the first user equipment 120 to access said at least one service.

Action 217

In some embodiments of the method in the second user equipment 120, the providing 216 of the code information comprises sending 217, to the first user equipment 110, the code information.

In some embodiments of the method in the second user equipment 120, the code information is equal to the first access code, or the code information is derivable from the first access code.

In some embodiments of the method in the second user equipment 120, said at least one service is provided by the radio base station 130. As an example, when the radio base station 130 provides the service, it may be a local service. As another example, when the radio base station 130 provides the service, the radio base station 130 may provide access to the service, which need not be a local service.

In some embodiments of the method in the second user equipment 120, said at least one service further is operated by the radio base station 130. As an example, a local service is said to be operated by the radio base station 130.

In some embodiments of the method in the second user equipment 120, said at least one service further is operated by a second network node while said at least one service is provided to the first user equipment 110 via the radio base station 130. In some embodiments, the radio communication system 100 further comprises the second network node, such as a second core network node.

In some embodiments of the method in the second user equipment 120, said at least one service is implemented in a service layer of a protocol stack used in the radio communication system 100. It may be noted that the service layer is different from a control layer and a transport/access layer of a protocol stack.

Figure 6:
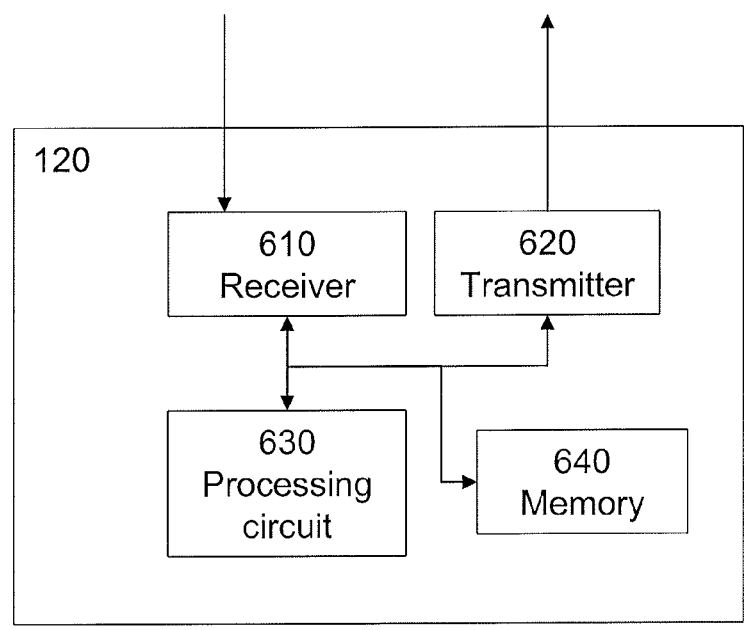
FIG. 6 shows a schematic block diagram of an exemplifying second user equipment configured for enabling a first user equipment to access at least one service.

Turning to FIG. 6, there is shown a schematic block diagram of an exemplifying second user equipment 120 configured for enabling a first user equipment 110 to access at least one service. The second user equipment 120 is served by the radio base station 130. The second user equipment 120 comprises a transmitter 620. The transmitter 620 is configured to send, to the radio base station 130, a request of granting the first user equipment (110) access to said at least one service. Moreover, either the second user equipment 120 comprises a receiver 610 configured to receive, from the radio base station 130, the first access code, or the transmitter 620 further is configured to send, to the radio base station 130, the first access code.

In some embodiments of the second user equipment 120, the second user equipment 120 may further comprise a processing circuit 630. The processing circuit 630 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the second user equipment 120, the second user equipment 120 may further comprise a memory 640 for storing software to be executed by, for example, the processing circuit. The software may comprise instructions to enable the processor to perform the method in the second user equipment 120 as described above. The memory 640 may be a hard disk, a magnetic storage medium, a portable computer diskette or disc, Flash memory, random access memory or the like.

In some embodiments of the second user equipment 120, the processing circuit (630) is further configured to provide code information, based on the first access code, for use by the first user equipment (110) to access said at least one service. The processing circuit (630) is configured to store the code information in the memory (640).

In some embodiments of the second user equipment 120, the transmitter 620 is further configured to send, to the first user equipment 110, code information, based on the first access code, for use by the first user equipment 120 to access said at least one service In some embodiments of the second user equipment 120, the transmitter 620 is further configured to send, to the radio base station 130, instructions for preparing the radio base station 130 to allow the first user equipment 110 to access said at least one service.

In some embodiments of the second user equipment 120, the receiver 610 is further configured to receive, from the radio base station 130, a first PLMN identity. The second user equipment 120 is associated to the first PLMN identity, and the first user equipment 110 is associated to a second PLMN identity which is different from the first PLMN identity.

In some embodiments of the second user equipment 120, the code information is equal to the first access code, or the code information is derivable from the first access code.

In some embodiments of the second user equipment 120, said at least one service is able to be provided by the radio base station 130.

In some embodiments of the second user equipment 120, said at least one service is further able to be operated by the radio base station 130.

In some embodiments of the second user equipment 120, said at least one service is further able to be operated by a second network node while said at least one service is provided to the first user equipment 110 via the radio base station 130. In some embodiments, the radio communication system 100 further comprises the second network node, such as a second core network node.

In some embodiments of the second user equipment 120, said at least one service is able to be implemented in a service layer of a protocol stack used in the radio communication system 100.

Figure 7:
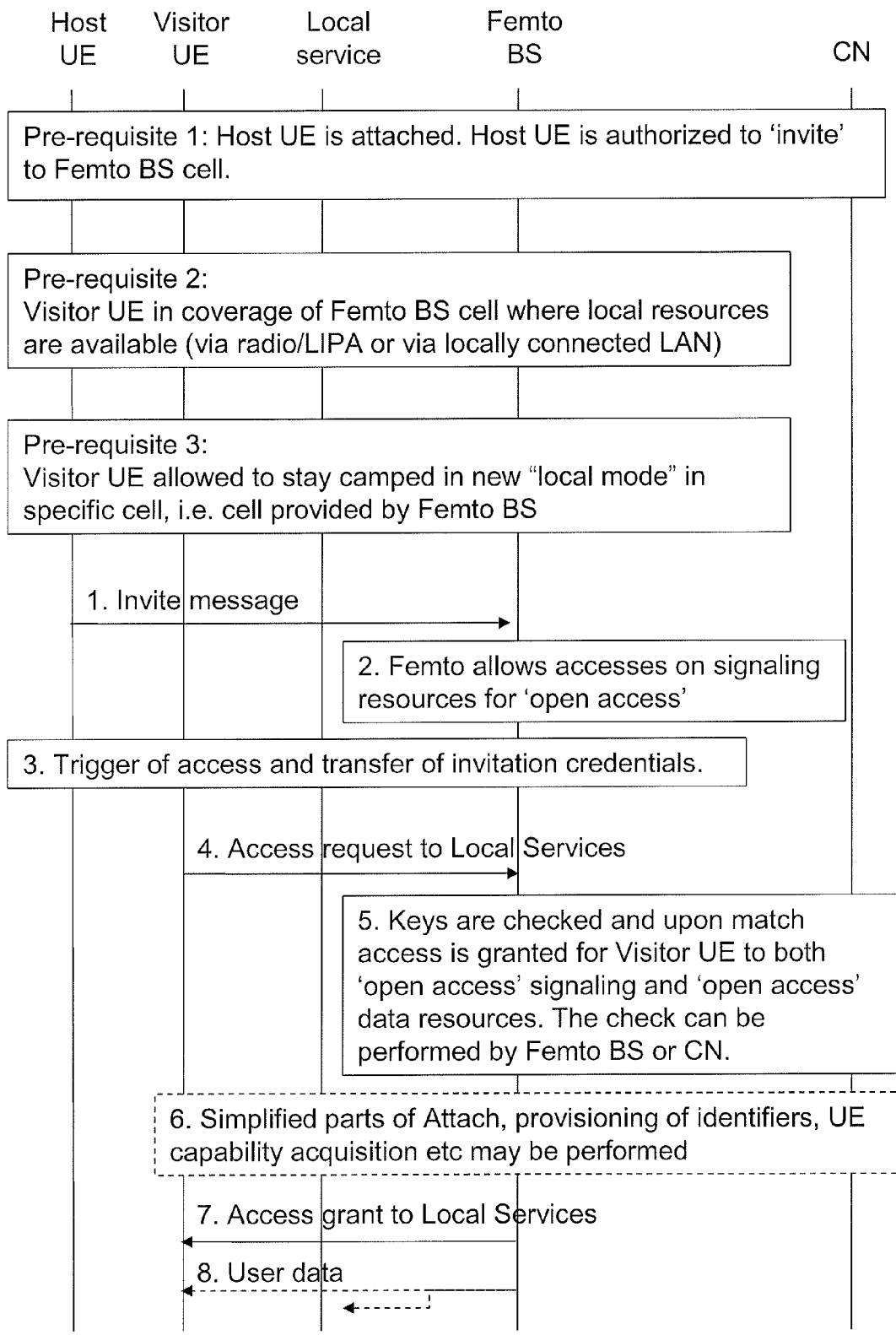
FIG. 7 shows a schematic, exemplifying combined signalling and flow chart, in conjunction with which exemplifying methods for granting a first user equipment access to at least one service are described.

With reference to FIG. 7, in which a further schematic, exemplifying signalling and flow chart of the methods presented herein is shown with reference to a schematic, exemplifying system. The schematic, exemplifying system comprises a femto base station (Femto BS), a core network node CN, a host user equipment, Host UE, and a visitor user equipment, Visitor UE. The Host UE is an example of the second user equipment and the Visitor UE is an example of the first user equipment. The femto base station may host one or more local services, shown as local service in FIG. 7. Furthermore, the femto base station is an example of the first radio base station.

First, it needs to be explained that there are two cases of radio capabilities:
  In a first case, UE can only be connected to one cell at a time, (i.e. only one single radio in the UE or carrier frequency of cells are too close and thereby not allowing two radios to operate simultaneously).
  In a second case, UE can be connected to more than one cell at a time (dual-radio, dual receiver or some scheme of time division between the cells).
  FIG. 7 is applicable to these cases.

Before invoking the methods presented herein, a number of pre-requisites need to be fulfilled. The pre-requisites in FIG. 7 are described to help the understanding of the methods herein.

A first pre-requisite implies that the Host UE is authenticated and authorized to act as Host (including the special case is that all attached UEs are authorized to act as a Host). The authorization to act as a Host may be limited to specific cells, i.e. there is some 'association' between the Host UE and the cells, where the UE can 'invite'. Possible 'association' mechanisms are described in the following section "Invite Procedure"

A second pre-requisite may be to enable the visiting user, Visitor UE, to select the Femto cell. Numerous methods for how the visitor UE may select the cell are possible. As an example, the standardized 'Manual selection of CSG cell' procedure, with minor adaptations may be used. The foreseen adaptations are:
  PLMN selection shall be overridden if visited cell belongs to a PLMN, which is unknown or known to be "forbidden" to Visitor UE 110, and
  currently Location updating is used to conclude the procedure (as an example, see 3GPP specification TS23.401 clause 4.6.3.1). This procedure may be supplemented by checking of code information (action 225). It may be that action 225 is a subsequent added procedure. The Locating updating procedure may at invitation of UE also be replaced by other procedures, e.g. a version of Attach procedure limited to local services.

A third pre-requisite may be needed for the first case of radio capabilities above, i.e. when the UE cannot be connected to more than one cell at a time and the HPLMN of the visiting UE has no roaming agreement with the HPLMN of the Femto cell. The third pre-requisite may be that the visiting UE is allowed to leave the current PLMN. This may be realized by, for example:
  i. Initial manual de-registering
  ii. Automatic de-registering as a first part of the 'Access request to local services' (see below FIG. 7, action 4)
  iii. The visiting UE simply abandons the current PLMN prior to the 'Access request to local services'

In the first case of radio capabilities, the visiting UE will loose connectivity, since it is not attached to any core network during the local connection. However, a plurality of enhancements may be provided to the visiting UE. The plurality of enhancements includes, but is not limited to:
  (a) A special "semi-de-registering" is used for visiting UEs, such that the visiting UEs HPLMN still sends Paging for incoming calls (despite that UE doesn't perform periodic location updates to confirm it's presence; maybe for a limited time period). Visiting UE has dual receivers, so the user is alerted of important incoming calls (e.g. using Calling Line ID) to enable the user to select connection; local or global.

(b) A special "semi-de-registering" is used for visiting UEs and a special VLR-HLR-interwork so that the visiting UEs HPLMN sends Paging for incoming calls to Femto BS cell in visited PLMN. In this case the visited UE performs a 'semi-Attach' to the VPLMN, which makes the UE location known, but limits services to forwarding of Paging.

(c) A modified version of attach procedure, "invited attach", is used by the VPLMN in/after action 5. The modification is two-fold: This grants access to a subset of regular services (including the full set) for the invited UE and the inviting UE is charged for these services.

(d) Visited network allows plain Internet access and visitor accesses the Home PLMN IMS services by re-registering at the new location/IP address.

Further, it shall be assumed that a set of rules apply for a local service mode, i.e. when the visiting UE is only allowed to access local services. In this manner, disturbance to other traffic is reduced. The set of rules may not be necessary for enhancement (c), since the visited operator is paid (by the host UE) for the used resources. When needed, the set of rules may be implemented completely in the Femto BS. The Femto BS will send, to the UE, a message about maximum UL power, allowed radio resources to use, etc. The set of rules may be sent via broadcast or in a dedicated message.

The third pre-requisite implies one modification in view of behaviour according to prior art:

UE is allowed to camp on some specific cell(s) belonging to a PLMN, which is otherwise considered 'forbidden' for the UE (i.e. the UE has tried to register, but was rejected). As an example, the visiting UE, such as the first user equipment, may previously have tried to access the PLMN of the cell to visit and found that it was rejected. The visiting UE may then store this PLMN as a forbidden PLMN. But now the "manual selection" shall override for this specific cell, although the PLMN as a whole is still forbidden (i.e. all other cells).

Now, a number of actions 1-8, will be described also with reference to FIG. 7.

First, however, an invite procedure describing the initiation of the methods presented herein is described. A regular 'authorized UE', referred to as the second user equipment herein, with authorization performed as defined in current standards, can invite 'non-authorized UEs', referred to as the first user equipment herein. It may be noted that 'non-authorized UEs' means that the UEs are not authorized by the core network using Home Location Register (HLR) data, but the proposed invitation procedure may be regarded as a simplified authorization procedure. The invitation procedure may be embodied in many different manners, depending on a trade-off between security and level of complexity. The Host UE is authenticated by the network, e.g. an AKA-procedure as known in the art has been executed. Examples of AKA-procedures are specified in 3GPP TS 33.102 (clause 6.3) or 3GPP TS 33.401 (clause 6.1). Hence, the Host UE is identified with a very high degree of certainty. All authenticated UEs may be allowed to act as Host UEs or alternatively this capability is restricted to some selected UEs. In case the capability of acting as a host is restricted to some selected UEs, a flag indicating that a selected UE may be acting as a host may be stored in Home Subscriber Server (HSS), in the SIM card or as a UE Capability, i.e. a characteristic of the UE which the network is informed about. The authorization may also be limited per UE to specific cell(s).

Different embodiments of the Invite procedure, roughly in order of increasing security, are:

Limit the cell access availability in time, e.g. access to special RACH-resources for 'invited UEs' is possible only during a time window.

Provide invited UE with a shared secret of Femto cell (pseudo statically configured. Can be the encryption key used for data transmission or used only for initial identification). The shared secret is an example of the first access code.

Provide both invited UE and Femto with the shared secret (dynamically configured).

If the shared secret is only used for initial identification, then Invited UE and Femto can exchange (longer) encryption keys to be used for subsequent data transmission.

Action 1

In some embodiments, the Host UE initiates an invitation to a Visitor UE in an action 1 by sending a message to the Femto base station. The invitation can be associated with one or several cells, e.g. as described in bullets a-c.

a The Host UE camps on the Femto base station cell, for which an invitation will be issued b The Host UE camps on one cell in a group of cells including the Femto base station cell, for which an invitation will be issued. This group can e.g. be a set of cells managed by an enterprise.

c The Host UE camps on any cell, but includes a reference to the Femto base station cell (or group of cells), for which an invitation will be issued.

The association is implicit for alternatives a and b and explicit for alternative c. The invitation message is forwarded in cases b and c. Forwarding can be done via the core network (CN) (if present) or via direct signalling paths between radio nodes (e.g. X2)

Action 2

In an exemplary action 2, the associated Femto base station(s) will allow access to services, based on the Host message. The Host UE message may include parameters like:

d Time window allowed for invited users. Restricting the window gives some measure of security and may reduce potentially wasted resources (Core Network may authenticate such users, but if their HPLMN is non-cooperating, then the invitation suffices)

e Selected encryption key and possibly also encryption algorithm. The values may be dynamically assigned or pseudo-static. The same information will be provided to the invited UE. The selected encryption key is an example of the first access code.

Action 3

In an exemplary action 3, which may occur prior to action 2, the visitor UE is provided with invitation credentials. The invitation credentials exemplify the code information. Different options are e.g.:

Manual transfer to visitor, who enters credentials in UE (similar to keys used in WLAN or Bluetooth)

Host UE sends SMS/email/message to Visitor UE. In case 1 this message must be sent before the Visitor UE has begun camping on the Femto cell. This message may include information about the Femto cell the invitation refers to (e.g. RAT, frequency, cell identity, parts of configuration to speed up access). Upon reception of this message, the invited UE proceeds with the process, optionally after invited user confirmation.

Action 4 and action 5

In exemplary actions 4 and 5, the Visitor (invited) UE, also referred to as the first user equipment, performs access using the provided credentials and the receiving Femto BS or CN (if present) will check correctness.

Action 6

In an exemplary action 6, a subset of the normal attach procedure is performed.

Action 7

If actions 5 and 6 completed with positive outcome, the Femto BS will admit the Visitor UE.

Action 8

The Visitor UE may receive (or send) user data.

In some embodiments, which emulates Bluetooth Secure Simple Pairing (which has multiple modes of operation), the signalling sequence will be augmented with the following actions:

f More UE capability exchange to agree about supported modes g Exchange of Public Keys h Authentication. This action is already presented, see above, but adjustments may be needed depending on chosen mode. As an example, the chosen mode may be Just works, Numeric comparison, Passkey Entry and Out of band.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, in a radio base station, for granting a first user equipment access to at least one service; wherein a second user equipment is served by the radio base station; wherein a radio communication system comprises the radio base station, the first user equipment, and the second user equipment; wherein the method comprises:
while the first user equipment is not served by the radio base station, receiving, at the radio base station and from the second user equipment, a first request for granting the first user equipment access to the at least one service;
sending a first access code from the radio base station to the second user equipment or receiving the first access code from the second user equipment at the radio base station;
receiving, at the radio base station and from the first user equipment, a second request for access to the at least one service and code information based on the first access code;
sending, from the radio base station and in response to the code information of the second request matching the first access code, an access grant to the first user equipment for granting the first user equipment access to the at least one service such that the first user equipment becomes served by the radio base station.

2. The method of claim 1, further comprising comparing the code information with the first access code to determine whether the code information matches the first access code.

3. The method of claim 1, further comprising:
sending a first Public Land Mobile Network (PLMN) identity, for identification of a network, to the first and second user equipments;
wherein the network comprises the radio base station;
wherein the second user equipment is associated with the first PLMN identity so as to allow the second user equipment to be served by the radio base station.

4. The method of claim 3, wherein the first user equipment is associated with the first PLMN identity sent by the radio base station.

5. The method of claim 4, further comprising sending information identifying the first user equipment to a first core network node in the radio communication system.

6. The method of claim 3, wherein the first user equipment is associated with a second PLMN identity different from the first PLMN identity.

7. The method of claim 1, wherein the at least one service is provided by the radio base station.

8. The method of claim 7, wherein the at least one service is operated by the radio base station.

9. The method of claim 7, wherein the at least one service is operated by a second network node while the at least one service is provided to the first user equipment via the radio base station.

10. The method claim 1, wherein the at least one service is implemented in a service layer of a protocol stack used in the radio communication system.

11. The method of claim 1, further comprising receiving, from the second user equipment, instructions for preparing the radio base station to allow the first user equipment to access the at least one service.

12. A radio base station for granting a first user equipment access to at least one service, wherein a second user equipment is served by the radio base station, wherein a radio communication system comprises the radio base station, the first user equipment and the second user equipment, wherein the radio base station comprises:
a receiver configured to:
while the first user equipment is not served by the radio base station, receive, from the second user equipment, a first request for granting the first user equipment access to the at least one service;
receive, from the first user equipment, a second request for access to the at least one service and code information based on a first access code;
a transmitter configured to send, to the first user equipment and in response to the code information matching the first access code, an access grant for granting the first user equipment access to the at least one service such that the first user equipment becomes served by the radio base station;
wherein:
either the receiver is configured to receive the first access code from the second user equipment; or
the transmitter is configured to send the first access code to the second user equipment.

13. The radio base station of claim 12, further comprising:
memory;
a processing circuit configured to:
compare the code information with the first access code to determine whether the code information matches the first access code;
store the first access code and the code information in the memory.

14. The radio base station of claim 12:
wherein the transmitter is configured to send a first Public Land Mobile Network (PLMN) identity, for identification of a network, to the first and second user equipments;
wherein the network comprises the radio base station;
wherein the second user equipment is associated with the first PLMN identity so as to allow the second user equipment to be served by the radio base station.

15. The radio base station of claim 14, wherein the first user equipment is associated with the first PLMN identity sent by the radio base station.

16. The radio base station of claim 15, wherein the transmitter is configured to send information identifying the first user equipment to a first core network node in the radio communication system.

17. The radio base station of claim 14, wherein the first user equipment is associated with a second PLMN identity different from the first PLMN identity.

18. The radio base station of claim 12, wherein the radio base station is configured to provide the at least one service.

19. The radio base station of claim 18, wherein the radio base station is configured to operate the at least one service.

20. The radio base station of claim 18, wherein the radio base station is configured to provide the at least one service to the first user equipment while the at least one service is operated by a second network node.

21. The radio base station of claim 12, wherein the at least one service is implemented in a service layer of a protocol stack used in the radio communication system.

22. The radio base station of claim 12, wherein the receiver is configured to receive, from the second user equipment, instructions for preparing the radio base station to allow the first user equipment to access the at least one service.

23. A method, in a second user equipment, for enabling a first user equipment to access at least one service; wherein the second user equipment is served by a radio base station; the method comprising:
 while the first user equipment is not served by the radio base station, sending, to the radio base station, a first request for granting the first user equipment access to the at least one service;
 either receiving a first access code from the radio base station or sending the first access code to the radio base station,
 wherein the access code grants access to the at least one service of the radio base station such that the first user equipment becomes served by the radio base station.

24. The method of claim 23, further comprising providing code information, based on the first access code, for use by the first user equipment to access the at least one service.

25. The method of claim 24, wherein the providing the code information comprises sending the code information to the first user equipment.

26. The method of claim 24, wherein the code information is equal to the first access code.

27. The method of claim 23, further comprising sending, to the radio base station, instructions for preparing the radio base station to allow the first user equipment to access the at least one service.

28. The method of claim 23:
 further comprising receiving a first Public Land Mobile Network (PLMN) identity from the radio base station, the second user equipment associated with the first PLMN identity;
 wherein the first user equipment is associated to a second PLMN identity different from the first PLMN identity.

29. A second user equipment configured for enabling a first user equipment to access at least one service; wherein the second user equipment is served by a radio base station; wherein the second user equipment comprises:
 a transmitter configured to send, while the first user equipment is not served by the radio base station, to the radio base station, a request for granting the first user equipment access to the at least one service;
 a receiver;
 wherein:
  either the receiver is configured to receive a first access from the radio base station, wherein the first access code grants access to the at least one service of the radio base station such that the first user equipment becomes served by the radio base station; or
  the transmitter is configured to send the first access code to the radio base station.

30. The second user equipment of claim 29, further comprising memory;
 a processing circuit configured to provide code information, based on the first access code, for use by the first user equipment to access the at least one service;
 wherein the processing circuit is configured to store the code information in the memory.

31. The second user equipment of claim 30, wherein the code information is equal to the first access code.

32. The second user equipment of claim 29, wherein the transmitter is configured to send code information to the first user equipment for use by the first user equipment to access the at least one service, the code information based on the first access code.

33. The second user equipment of claim 29, wherein the transmitter is configured to send, to the radio base station, instructions for preparing the radio base station to allow the first user equipment to access the at least one service.

34. The second user equipment of claim 29:
 wherein the receiver is configured to receive a first Public Land Mobile Network (PLMN) identity from the radio base station,
 wherein the second user equipment associated with the first PLMN identity, and the first user equipment is associated to a second PLMN identity which is different from the first PLMN identity.

* * * * *